United States Patent

Waligora et al.

[11] Patent Number: 6,109,594
[45] Date of Patent: Aug. 29, 2000

[54] DISENGAGEABLE FORCE REGULATOR FOR LINEAR ELECTRIC SCREWJACK

[76] Inventors: Laurent Waligora, 14, Rue des Minimes; Julien Waligora, 53, Route de Bourges, both of Issoudun, France, 36100

[21] Appl. No.: 09/125,405
[22] PCT Filed: Dec. 19, 1997
[86] PCT No.: PCT/FR97/02373
§ 371 Date: Aug. 17, 1998
§ 102(e) Date: Aug. 17, 1998
[87] PCT Pub. No.: WO98/27365
PCT Pub. Date: Jun. 25, 1998

[30] Foreign Application Priority Data

Dec. 19, 1996 [FR] France .................................. 96 16082

[51] Int. Cl.[7] ............................................... B66F 3/08
[52] U.S. Cl. ............................................. 254/98; 254/103
[58] Field of Search ............................ 254/98, 103, 424, 254/425; 269/329

[56] References Cited

U.S. PATENT DOCUMENTS

| | | | |
|---|---|---|---|
| 4,015,824 | 4/1977 | Profet | 254/98 |
| 4,221,363 | 9/1980 | Jasper | 254/98 |
| 4,234,151 | 11/1980 | John et al. | 254/98 |
| 4,339,113 | 7/1982 | Vosper | 254/98 |

*Primary Examiner*—David A. Scherbel
*Assistant Examiner*—Daniel C. Shanley
*Attorney, Agent, or Firm*—Young & Thompson

[57] ABSTRACT

The invention concerns a device making it possible to firstly limit the dynamic or static force applied to a linear electric jack with a reversible screw/nut system, and secondly translation-disengage the screw of the jack. This device is formed of an element (2) integral with the screw (7) of the jack and an element (1) integral with the activated load and interconnected by a friction system (3). The force applied on the screw (7) tends to make the latter rotate inside the screw (8) of the jack. This rotation is stopped by the friction system (3) until the latter slides and separates the elements (1) and (2). The screw (7) then rotates with respect to the element (1) which limits the force. The replacement of the friction element (3) by a coupling makes it possible to externally control the rotation and translation of the screw (7). The end of travel stops (13) secured to the screw (7) rotate with this screw whilst retaining their characteristics.

12 Claims, 5 Drawing Sheets

DISENGAGEABLE FORCE REGULATOR FOR LINEAR ELECTRIC SCREWJACK

FIELD OF THE INVENTION

The present invention concerns a mechanical device able to:

limit the force of a linear electric jack with a reversible screw/nut system, limit the static force supported by the jack on stopping, disengage the screw of the jack from its drive system so as to render it translation-free.

BACKGROUND OF THE INVENTION

The solution currently used consists of uncoupling the reversible screw/nut system from its drive motor by means of a claw coupling controlled externally or by a lever whose movement depends on the axial force applied to the screw of the jack.

The external mechanical device located between the load and the screw of the jack drives the lever when the force exceeds a pre-established value.

The drawbacks of this system are:

the rapid wear of the claw coupling device, the wear of each element of the device has an effect on the adjustment which needs to be regularly reset, the device activating the lever requires a significant axial movement which causes inaccuracy concerning the positioning of the load linked to the jack, it only functions in a single direction, the production of this system is complex.

SUMMARY OF THE INVENTION

The device of the invention is able to resolve these drawbacks.

This device includes two elements, one integral with the screw of the jack and the other integral with the load able to rotate with respect to the other on a given axis. The axial translation movement between these two elements cannot take place.

Disposed between these two elements is a friction system. At rest, the rotation of the two elements with respect to the other is prevented by this friction system. The screw of the jack is therefore rendered integral with the load and this blocks rotation of this screw and creates a torsion torque on the friction system when the jack is functioning.

Two cases of functioning appear:

1. Dynamic force limiter of the jack when the latter moves the load:

The friction torque between the screw and the nut tends to move the screw in rotation. This rotation is prevented until the friction system slides and separates the screw from the load which is no longer translation-driven.

This therefore produces a limitation of the force of the jack.

2. Static force limiter supported by the jack when the latter does not move the load:

The device uses the reversibility of the screw/nut system.

Reversibility means that, under the action of an axial force on one of the screw or nut elements, the other, blocked in an axial direction, starts to rotate.

The force applied by the load in the axis of the screw tends to drive it in rotation. This rotation is prevented until the friction system slides and separates the screw from the load.

The rotation of the screw causes the latter to advance into the nut and actuates a linear movement of the load.

This device functions both on traction and on compression.

The friction system used may be a device with balls, friction disks, multipolar permanent magnets or be of another type.

When the jack has stops for cutting off feeding of the drive motor when the end of travel is reached, the device of the invention involves the use of end of travel stops whose functioning is symmetrical around the axis of the jack as the screw is rotating.

These stops ensure the same total travel of the rotating screw, regardless of its angular position.

According to particular embodiments, the end of travel stops can be made up of:

a circular mechanical element associated with an electric power circuit breaker, a pneumatic or optical detector or another type of detector.

an annular magnet associated with a dry contact magnetic detector or a <<Hall>> effect detector using a semi-conductor or similar type of device.

DETAILED DESCRIPTION OF THE PREFERRED EMBODIMENTS

Figure 1:
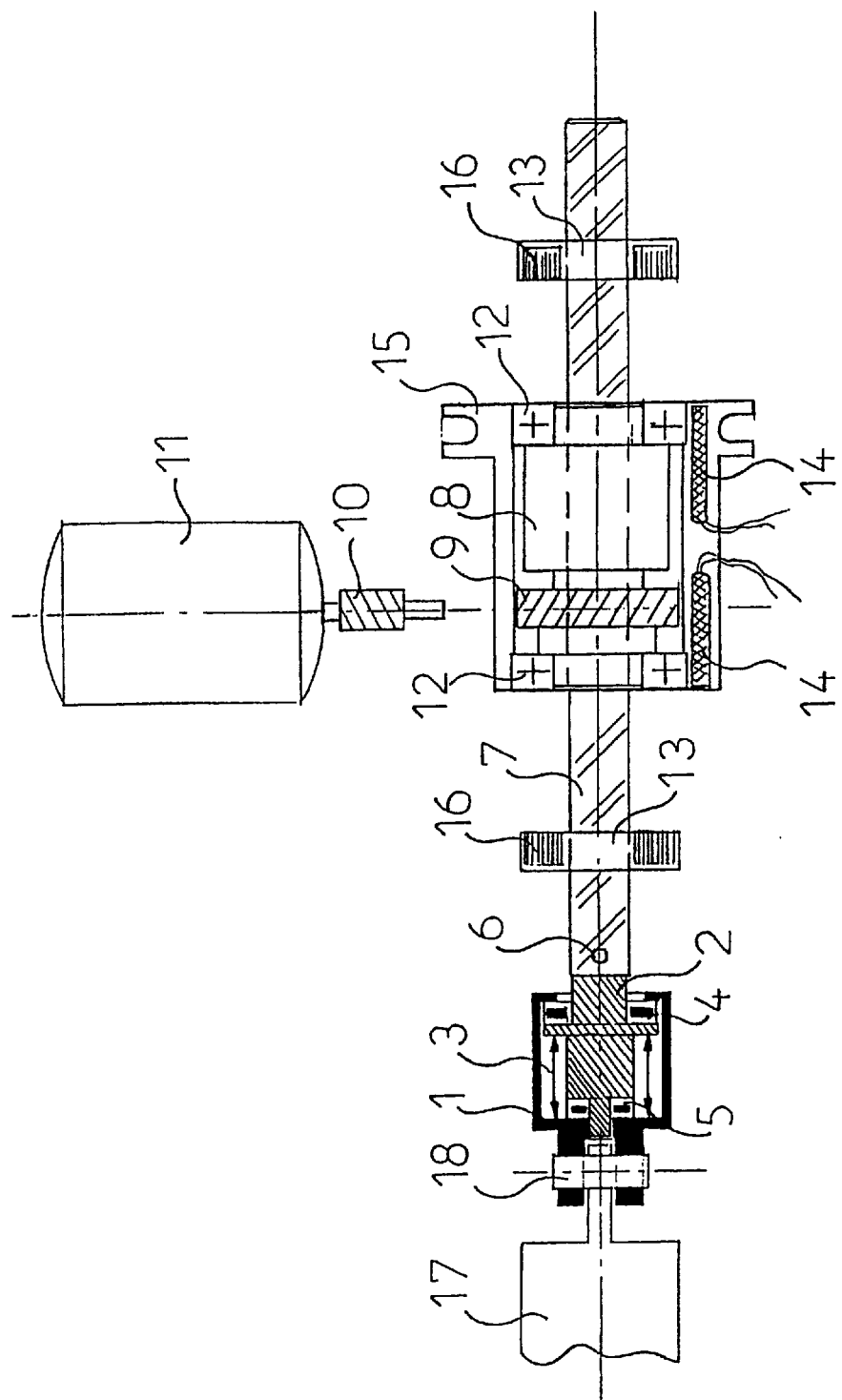
FIG. 1 is a cutaway view of the device of the invention.

With reference to these drawings, the jack itself, which has been simplified so as to understand the invention, comprises a body (15) containing a nut (8) immobilised along the axis between two rolling stops (12) acting against end surfaces of nut (8). This nut is driven in rotation with the aid of a motor (11) by means of a gear train with two pinions (9) and (10). The nut (8) moves the screw (7) which transforms the rotating movement of the nut into a translation movement of this screw. The load (17), activated by the screw, can only undergo a translation movement with respect to the body (15) secured to a structure. The element (1) integral with the load is therefore blocked in rotation with respect to the body (15). On stoppage of the jack, the nut (8) is immobilised in rotation by a suitable electromechanical device (not shown).

According to particular embodiments:

The jack may be equipped with a screw (7)/nut (8) with balls or any type of thread with a fast pitch to favour reversibility.

The screw (7) and nut (8) can be inverted, the nut moving in translation by means of the rotating screw. In this case, the screw (7) and nut (8) need to be inverted as regards the entire description of the device of the invention.

With reference to FIG. 1, the device of the invention comprises an element (2) rendered integral with the screw (7) of the jack with the aid of an assembling element (6), and an element (1) integral with the load (17) by means of the pin (18).

These two elements (1) and (2) are able to rotate with respect to each other around the same axis, but are unable to move in translation with respect to each other along this axis. They can be concentric and circular, one of them forming a protection covering cap around the whole device.

A friction system (3), which acts as a torsion torque limiting device situated between the elements (1) and (2), provides the link between these two elements. The friction system (3) is therefore subjected to a torsion torque by the fact that it blocks rotation of the screw (7).

There are two cases of functioning:

1. Dynamic force limiter of the jack when the latter moves the load (17):

The friction torque between the screw (7) and the nut (8) tends to move the screw in rotation. This rotation is prevented until the friction system (3) slides and separates the elements (1) and (2). The value of the force from which rotation occurs depends on the adjustment of the friction system.

2. Static force limiter supported by the jack when the latter does not move the load (17):

The device uses the reversibility of the screw (7)/nut (8) system. The force applied by the load (17) in the axis of the screw (7) tends to screw the latter into the nut (8). This generates a torsion torque to the element (2) transmitted to the element (1) by means of the friction system (3).

The rotation of the screw (7) is prevented until the friction system (3) slides and separates the elements (1) and (2).

The value of the force from which rotation occurs depends on the adjustment of the friction system.

Figure 2:
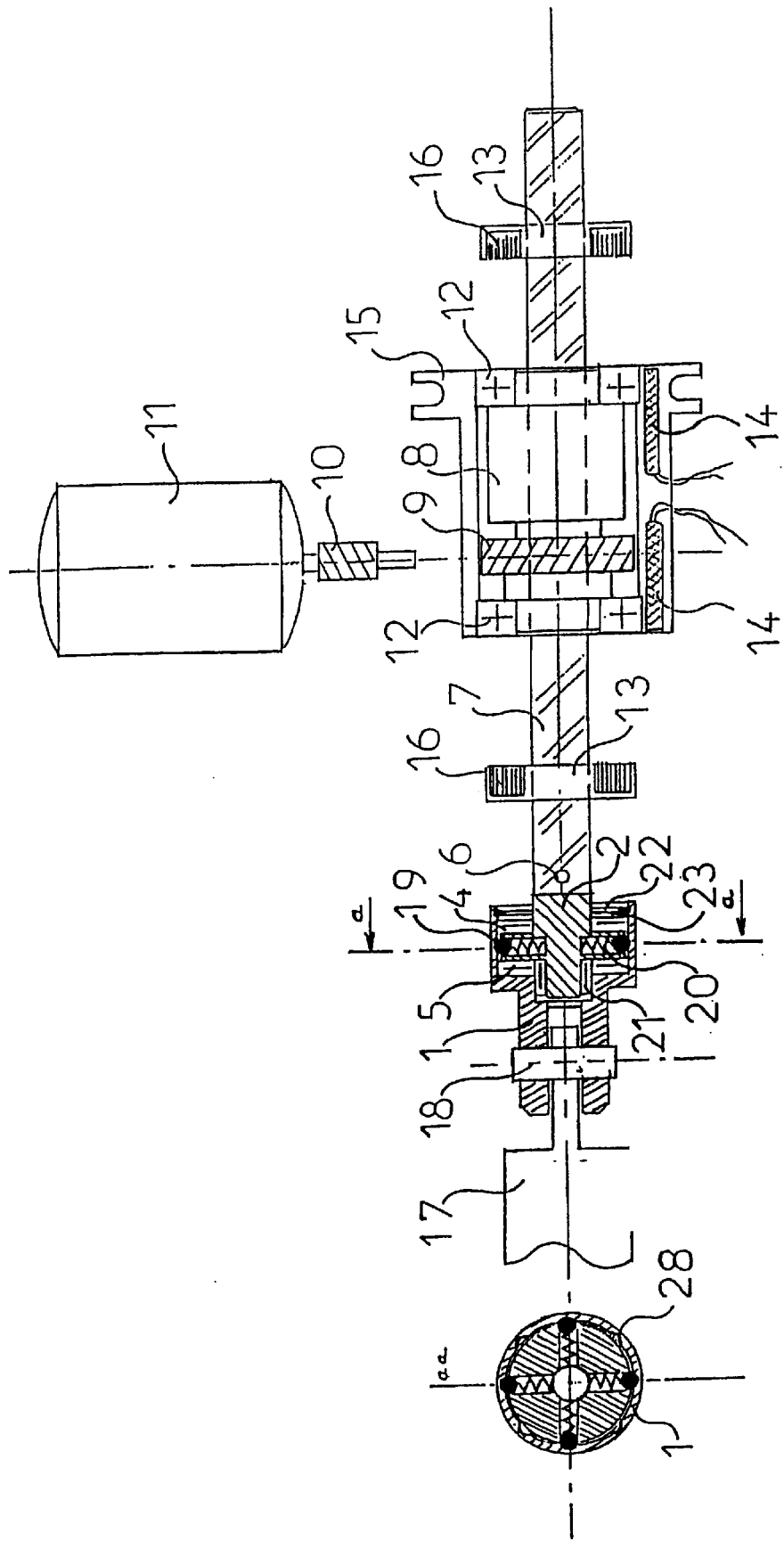
FIG. 2 is a cutaway view of a first variant of this device.

In the embodiment shown on FIG. 2, the friction system (3) is replaced by a ball friction system. The device comprises an element (2) rendered integral with the screw (7) of the jack with the aid of a pin (6) for example, and an element (1) integral with the load (17) activated by the jack.

These two elements are concentric and are able to rotate with respect to each other around the same axis.

An assembly composed of rolling bearing stops (4) and (5), the rolling bearing (21) and the backplate (23) stopped by the elastic ring (22) allows rotation between the elements (1) and (2) whilst transmitting the axial forces.

The element (2) comprises one or several recessed holes in each of which slides a ball (19) pushed by a spring (20). The element (1) comprises notches (28), the number of these being more than the number of balls (19) and housing these balls.

There are two cases of functioning:

1. Dynamic force limiter of the jack when the latter moves the load:

The friction torque between the screw (7) and the nut (8) tends to drive said screw in rotation. This generates a torsion torque to the element (2) transmitted to the element (1) by means of the balls (19) pushed by the springs (20).

The rotation of the screw (7) is prevented until the balls (19) escape from the notches (28), thus compressing the springs (20) under the action of the torsion torque.

The value of the force from which rotation occurs depends on the efficiency of the screw (7)/nut (8) system, the value of the stiffness of the springs (20), as well as the shape and dimensions of the elements making up the device.

2. Static force limiter supported by the jack when the latter does not move the load:

The device uses the reversibility of the screw/nut system.

The axial force exerted on the screw (7) tends to screw the latter into the nut (8). This generates a torsion torque on the element (2) transmitted to the element (1) by means of the balls (19) pushed by the springs (20).

The rotation of the screw (7) is prevented until the balls (19) escape from the notches (28), thus compressing the springs (20) under the action of the torsion torque.

The value of the force from which rotation is produced depends on the efficiency of the screw (7)/nut (8) system, the value of the stiffness of the springs (20) and the shape and dimensions of the elements constituting the device.

According to particular embodiments:

The balls (19) can be replaced by rollers, blocks or bolsters of any shape.

The elements (1) and (2) can be inverted, the notches (28) then being located on the element (2).

Figure 3:
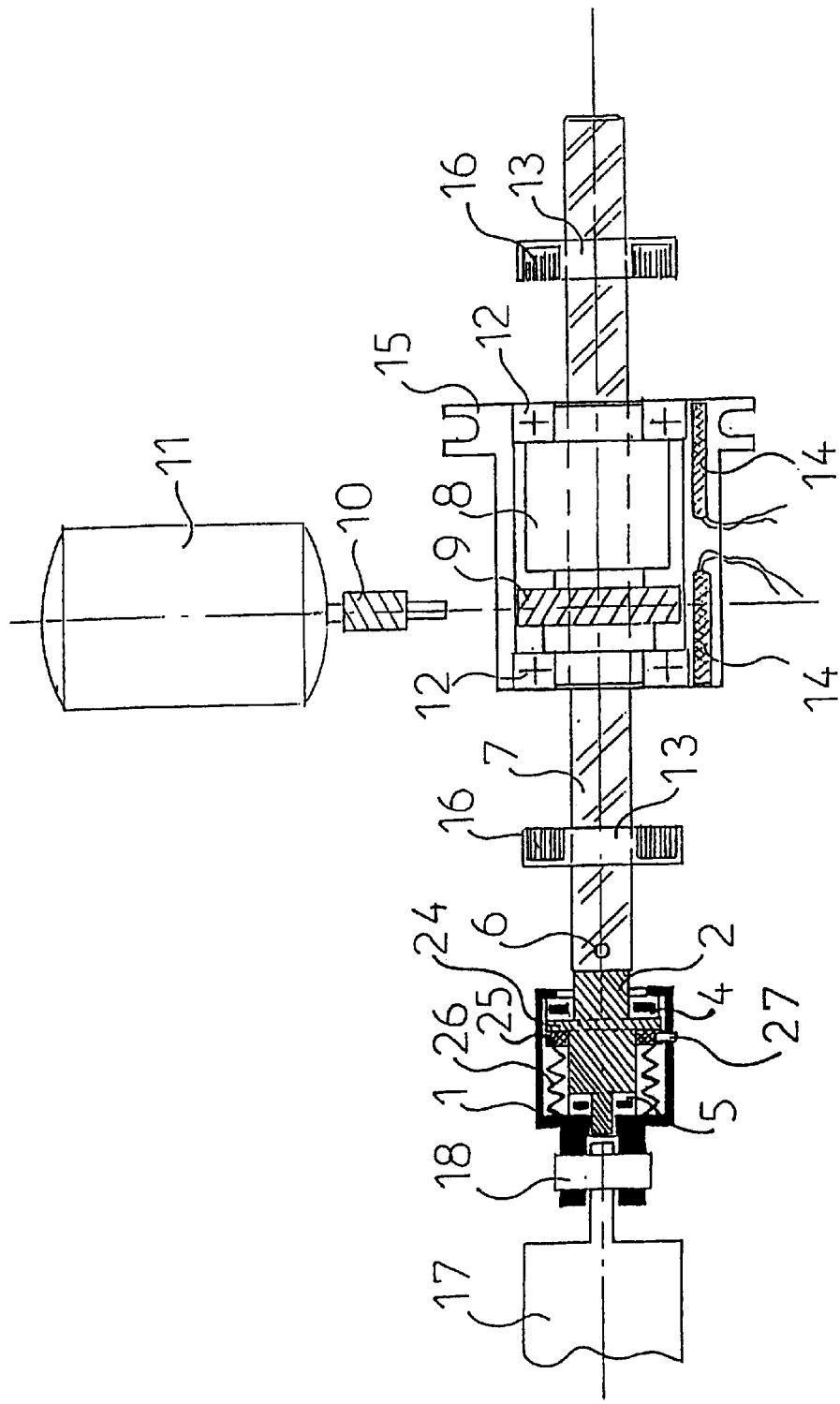
FIG. 3 is a cutaway view of a second variant of this device.

In the embodiment shown on FIG. 3, the friction system (3) is replaced by a disk friction system.

The element (2) integral with the screw (7) of the jack comprises a disk (24). The element (1) integral with the load (17) comprises a disk (25) able to move along the axis plated against the disk (24) by the spring (26). The disk (25) cannot rotate with respect to the element (1), the pin (27) blocking its rotation. The elements (1) and (2) can rotate with respect to each other around the same axis.

The thrust roller bearings (4) and (5) permit rotation of the element (2) with respect to the element (1) whilst transmitting the axial forces.

The moment of the torque from which sliding of the disks (24) and (25) in relation to each other occurs depends on the stiffness of the spring (26), the friction coefficients of the disks and their surface area.

The two cases of functioning are identical to those of the embodiment of FIG. 1.

Figure 4:
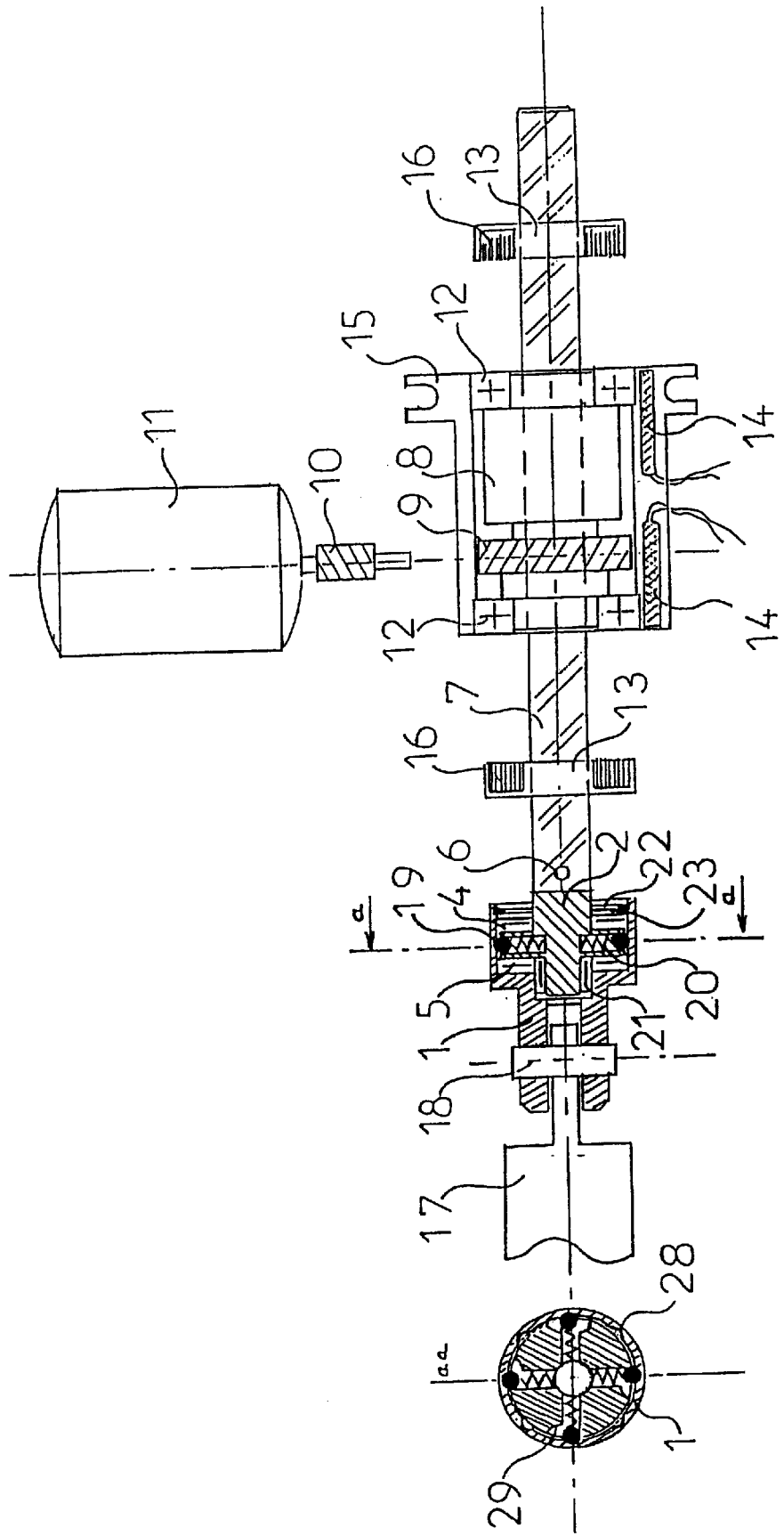
FIG. 4 is a cutaway view of a variant of the device according to FIG. 2.

The embodiment of FIG. 4 is derived from that of FIG. 2. The device is modified so as to limit the force applied to the screw (7) of the jack solely in a single direction. As regards the other direction, the device is blocked and does not limit the force. Housings (29) cut in the element (2) enable the balls (19) pushed by the springs (20) to move tangentially to the element (2) and in a single direction when rotation between the elements (1) and (2) starts to occur. The balls are then engaged in the housings (29), can no longer move radially inside the element (2) and the springs (20) can no longer be compressed.

The depth of the housings (29) is such that the balls (19) remain blocked inside the notches (28) and prevent free rotation between the elements (1) and (2):

the dynamic force is no longer limited in an axial direction corresponding to the position of the housings (29) when the jack moves the load (17), the static force supported is no longer limited in an axial direction corresponding to the position of the housings (29) when the jack does not move the load.

When the torsion torque reduces and changes direction, the device is unblocked and the balls (19) return to the axis of the springs (20) which can again be compressed. The device then behaves like that of FIG. 2 and acts as a force limiter.

The housings (29) can be cut on either side of the balls (19) along the desired locking direction. The number of said housings can be equal to or less than the number of balls. These housings are all embodied in the same direction.

The device of FIG. 1 can be modified so as to transform it into a system for disengaging the rod of the jack. In this variant, the friction system (3) is replaced by a coupling. This coupling, associated with an external control device, makes it possible to:

render integral the elements (1) and (2) if the disengaging control is not activated. The jack can then push or pull the load (17) with all the force required.

instantly separate the elements (1) and (2) if the disengaging control is activated. This renders the screw (7) fully free in rotation and translation with respect to the nut (8) as the screw(7)/nut (8) system is reversible. The screw (7) and the load (17) attached to it are then free in translation along their axis with respect to the body (15) of the jack.

The functions for limiting the force and for disengaging the screw (7) can be combined inside a given box so as to obtain a jack with limited force and with a screw (7) able to be disengaged in translation with respect to the body (15) where the electric power has been cut from its motor, for example.

Figure 5:
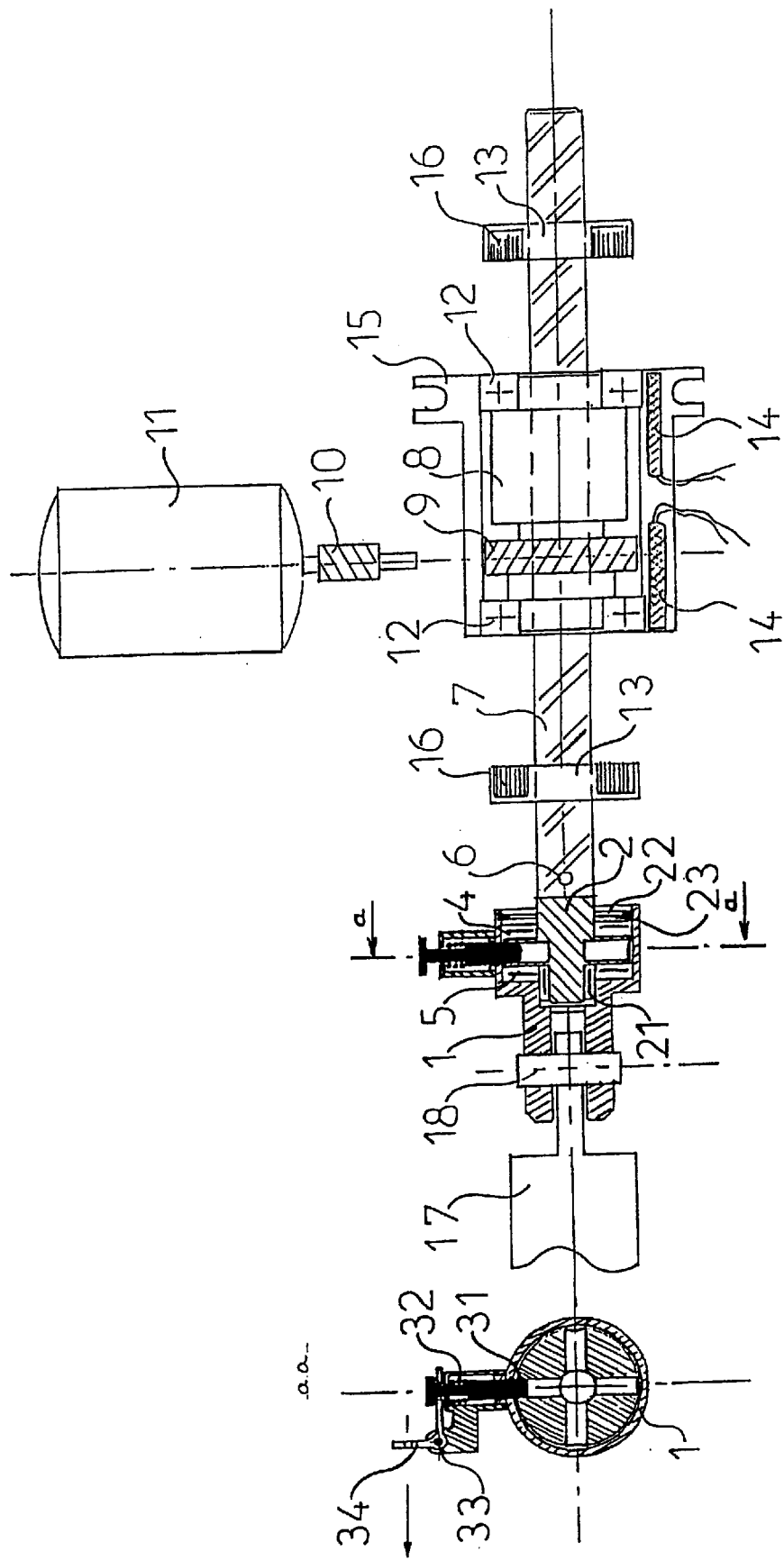
FIG. 5 is a cutaway view of a third variant of the device of FIG. 1.

In the embodiment shown on FIG. 5, the coupling is made up of a blocking finger (31) pushed by a spring (32). This finger renders the elements (1) and (2) integral at rest. Action of the lever (34) articulated around the axis (33) secured to the element (1) lifts up the blocking finger (31), thus compressing the spring (32) and renders the elements (1) and (2) able to rotate freely with respect to each other. In this case, the screw (7) rotates freely and can be screwed freely onto and unscrewed freely from the nut (8).

According to particular embodiments, the action on the lever (34) can be effected manually or by any electromechanical, pneumatic or mechanical control device.

The functioning of the two end of travel stops (13) integral with the screw (7) is symmetrical around the axis of the screw (7), that is regardless of the angular position of said screw.

These stops (13) can be made up of:

- an annular magnet (16) with an axial field which, without any contact, controls a detector (14) sensitive to the magnetic field of standard glass bulb dry contacts, a <<Hall>> effect detector or other type of detector.
- a circular mechanical element controlling an electric power circuit breaker, an optical detector, pneumatic detector or other type of detector.

The detectors (14) situated inside the body (15) of the jack generate a signal which can be used to control stoppage of the motor (11) when the end of travel has been reached.

These end of travel stops (13) are circular.

What is claimed is:

1. Device for limiting the force of a linear jack having a reversible screw/nut system with one element of the screw and nut system being rotated by a drive system and another corresponding element being translated accordingly and controlling translation of a load, the device comprising a first translated member integral with the translated element of the screw/nut system and a second member integral with a load activated in translation by the jack, said two members being able to rotate with respect to each other, and having a friction system disposed between said two members for ensuring: i) the linking of said two members when a torsion torque subjected to the friction system by the second member and by the first translated member is less than a predetermined value, and ii) the sliding of said two members when the torsion torque exceeds the predetermined value.

2. Device according to claim 1, wherein the friction system comprises a first element mounted on the first translated member and having dummy holes in which a ball slides, a cylindrical second element mounted on the load and comprising notches housing the balls and a spring biasing the ball against the internal surface of the cylindrical element, said balls tending to escape from the notches when a sufficient torsion torque is applied between said two elements of the friction system to allow relative movement of these elements.

3. Device according to claim 1, wherein the friction system comprises a means to allow rotation of the rotated member in one direction only.

4. Device according to claim 3, wherein the friction system comprises a first element mounted on the first translated member and having dummy holes in which a ball slides, a cylindrical second element mounted on the load and comprising notches housing the balls and a spring biasing the ball against the internal surface of the cylindrical element, said balls tending to escape from the notches when a sufficient torsion torque is applied between said two elements of the friction system to allow relative movement of said two elements and wherein said first element comprises cuts in the wall of the holes to enable the balls pushed by the springs to move tangentially relative to said first element in one direction when rotation between the friction system elements starts to occur, and to cause the ball to remain engaged inside the notches when the friction system elements tend to rotate in an opposite direction.

5. Device according to claim 1, wherein the friction system is made up of two friction disks plated against each other by a spring.

6. Device according to claim 2, wherein said two elements of the friction system are concentric and circular, one of said two elements forming a protection cap around the device.

7. Device according to claim 1, wherein it further comprises end of travel stops whose functioning is symmetrical around the axis of the said stops controlling detectors provided inside the body of the jack which generate a signal used to control stoppage of a motor when the end of travel is reached.

8. Device for limiting the force of a linear jack having a reversible screw/nut system, one element of the screw and nut system being rotated by a drive system and another cooperating element being translated accordingly and controlling translation of a load, said device comprising a member integral with the translated element of the screw/nut system and a member integral with a load activated in translation by the jack, these two members being able to rotate with respect to each other, and a movable coupling associated with an external control device controlling the movement of the coupling to either render integral the elements so that the jack is able to push or pull the load or instantly allow a relative movement of the two elements and then allow a free translation movement of the translated element.

9. Device according to claim 8, wherein the coupling comprises a blocking finger pushed by a spring and controlled by a lever so that the elements are rendered integral at rest and free in rotation with respect to each other when action on the lever lifts up the blocking finger.

10. Device according to claim 8, further comprising end of travel stops whose functioning is symmetrical around the axis of the screw, said stops controlling detectors provided inside the body of the jack which generate a signal used to control stoppage of the motor when the end of travel is reached.

11. Linear jack comprising a reversible screw/nut system having one element rotated by a drive system and another element translated accordingly and controlling translation of a load, and a device for limiting the force of the linear electric jack, said device comprising a member integral with the translated element of the screw/nut system and members integral with the load activated in translation by the jack, these two members being able to rotate with respect to each other and a friction system disposed between the members and ensuring the linking of the members when the torsion torque subjected to the friction system by the rotated member by the translated member is less than a predetermined value, but the sliding of the members when the torsion torque exceeds the predetermined value.

12. Linear jack having a reversible screw/nut system, one element of the screw and nut system being rotated by a drive system and the other element being translated accordingly and controlling translation of a load, comprising a member integral with the translated element of the screw/nut system and a member integral with a load activated in translation by the jack, these two members being able to rotate with respect to each other, and a movable coupling associated with an external control device controlling the movement of the coupling to either render integral the elements so that the jack is able to push or pull the load or instantly allow a relative movement of the two elements and then allow free translation movement of the translated element.

* * * * *